(12) United States Patent
Orlik et al.

(10) Patent No.: US 8,452,310 B1
(45) Date of Patent: May 28, 2013

(54) METHOD FOR GENERATING COVERAGE MAPS FOR WIRELESS NETWORKS WITH MOBILE DEVICES

(75) Inventors: Philip Orlik, Cambridge, MA (US); Jianlin Guo, Newton, MA (US); Yukimasa Nagai, Kanagawa (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/435,896

(22) Filed: Mar. 30, 2012

(51) Int. Cl.
*H04Q 7/20* (2006.01)
(52) U.S. Cl.
USPC ............... 455/456.5; 455/456.1; 455/418; 701/200
(58) Field of Classification Search
USPC ............ 455/456.5, 456.1, 418; 701/200
See application file for complete search history.

(56) References Cited

U.S. PATENT DOCUMENTS

| | | | | |
|---|---|---|---|---|
| 8,214,145 | B2 * | 7/2012 | Shimotani et al. | 701/451 |
| 2004/0203436 | A1 * | 10/2004 | Oesterling | 455/67.11 |
| 2007/0271036 | A1 * | 11/2007 | Atarashi | 701/211 |
| 2011/0276263 | A1 * | 11/2011 | Shimotani et al. | 701/200 |

* cited by examiner

*Primary Examiner* — Danh Le
(74) *Attorney, Agent, or Firm* — Dirk Brinkman; Gene Vinokur

(57) ABSTRACT

A coverage map for a wireless network is generated. The network includes a server communicating with clients in a coverage area. The clients are mobile devices. At the server, location and reliability information from each client is received. The server then constructs and maintains the coverage map according to the location and reliability information. The coverage map is used to deliver telematic information from the server to the clients in response to requests by the clients.

12 Claims, 8 Drawing Sheets

METHOD FOR GENERATING COVERAGE MAPS FOR WIRELESS NETWORKS WITH MOBILE DEVICES

FIELD OF THE INVENTION

This invention relates to wireless communications, and more particularly to coverage of mobile communications.

BACKGROUND OF THE INVENTION

Currently there is an enormous amount of data available to mobile devices (mobiles or clients), e.g., cellular telephones, smart telephones, tablet computers, etc. In essence, the entirety of information stored publicly on the world wide web (WWW) is available to users of clients. This availability has enabled a plethora of new applications which make use of untethered access to the information.

In particular, clients can now participate in "cloud computing" applications in which a majority of the computing and data storage functionality for the clients is on a server, which has an Internet connection and only pertinent information or computational results are sent to the clients. This generally, has the effect of minimizing the storage and computation that occurs at the clients.

A concrete example application is vehicle navigation. It is assumed that a vehicle includes a mobile device, either integrated into the vehicle, or carried by an occupant of the vehicle.

Conventionally, a Global Positioning System (GPS) can be used. In this case, the client requires storage of maps for areas in which the vehicle travels. Then, computation of routes can be performed locally by the client. The client can obtain the maps from the server as needed. Alternatively, the server can compute the routes to reduce storage and computation at the client. Of course, this can requires the addition of communication functionality for the GPS so that users of the application can request routes to their destinations, receive maps and results of route computations.

As a further benefit, a navigation application running on a server can make efficient use of side information to improve route computations. For example, the server can real-time traffic reports and road work schedules to optimize the routing computations. The side information can also be made directly available to the clients. However, this would consume wireless network resources.

Thus, it seems reasonable to restrict the amount of information transmitted directly to clients to minimize the communication load in network.

In general, it is beneficial to ensure that any "cloud based" application minimize the amount of communication that occurs between the server and the clients. This reduces the cost incurred for delivering services based on an amount of "air time" that is used. In addition, it allows the support of more clients for a fixed amount of air time.

To do this efficiently, a "coverage map" would be advantageous. The coverage map would indicate network characteristics and client locations.

A common problem is obtaining accurate coverage map information. Firstly, knowledge of the coverage map, if it is known at all, will typically reside with the operator of the network. This information is normally not released as it contains sensitive information.

SUMMARY OF THE INVENTION

Embodiments of the invention provide a method to obtain a map of coverage map of a wireless network.

DETAILED DESCRIPTION OF THE PREFERRED EMBODIMENT

Figure 1A:
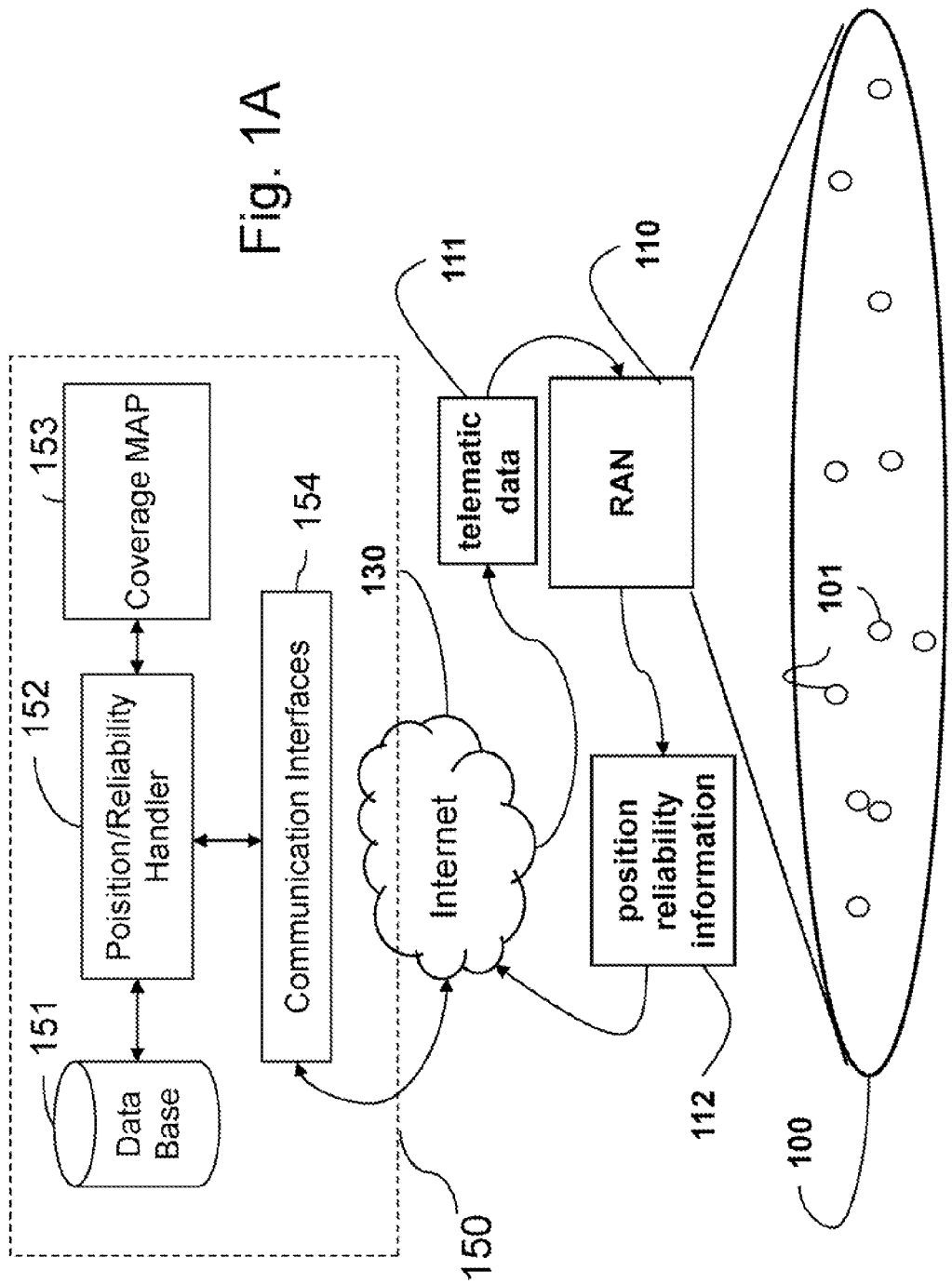
FIG. 1A is a schematic of a wireless network with mobile device according to embodiments of the invention.

As shown in FIG. 1, the embodiments of our invention generate a coverage map 1153 for a wireless network including mobile devices (clients) 101 and a server 150. The server can be connected to a base station to communicate packets between the server and the clients. The coverage map includes reliability information, such as a quality of radio signals in the network. The server can store any number of coverage maps for different networks. The base station is conventional, and not shown. Communications between the server and clients is, e.g., via the Internet 130 using any known wireless communication protocol.

For an example, we describe a telematics application. The telematics application includes data for navigation, entertainment, information, and the like. However, the generation and use of the coverage map is generally applicable to any cloud based or client/server application that runs over a network with mobile clients. The telematic data 111 are delivered to the clients using the coverage map, in response to client request. The coverage map is constructed and maintained from location and reliability information 112 provided by the clients 101.

A particular, cloud based application in which we are interested is vehicle navigation and vehicle telematics (data collection). In this case, the main application functions are carried out on the telematics server 150, which is responsible for collecting information from vehicles within the coverage area, 100, including current position, desired destination, recent drive times/road conditions. In addition, the telematics server 150 provides information to vehicles in the form of navigation updates and location based services such as points of interest messages. The telematics server includes of a database 151, a position and reliability information handler 152, the coverage map, 153 and various communication interfaces 154.

The database contains information pertaining to points of interest and the location of the client vehicles 101. The reliability information handler manages the tasks of transmitting route update information and other messages to vehicles, as well as receiving position updates, telematic data, and service requests from the vehicles.

A key feature of the telematics server is the use of the coverage map, which provides a map of link quality for the area covered by the RAN. The reliability information handler uses the MAP data to conduct tasks such as scheduling packet transmission to the vehicles based on their position and the corresponding link quality stored in the coverage map at that position.

Figure 1B:
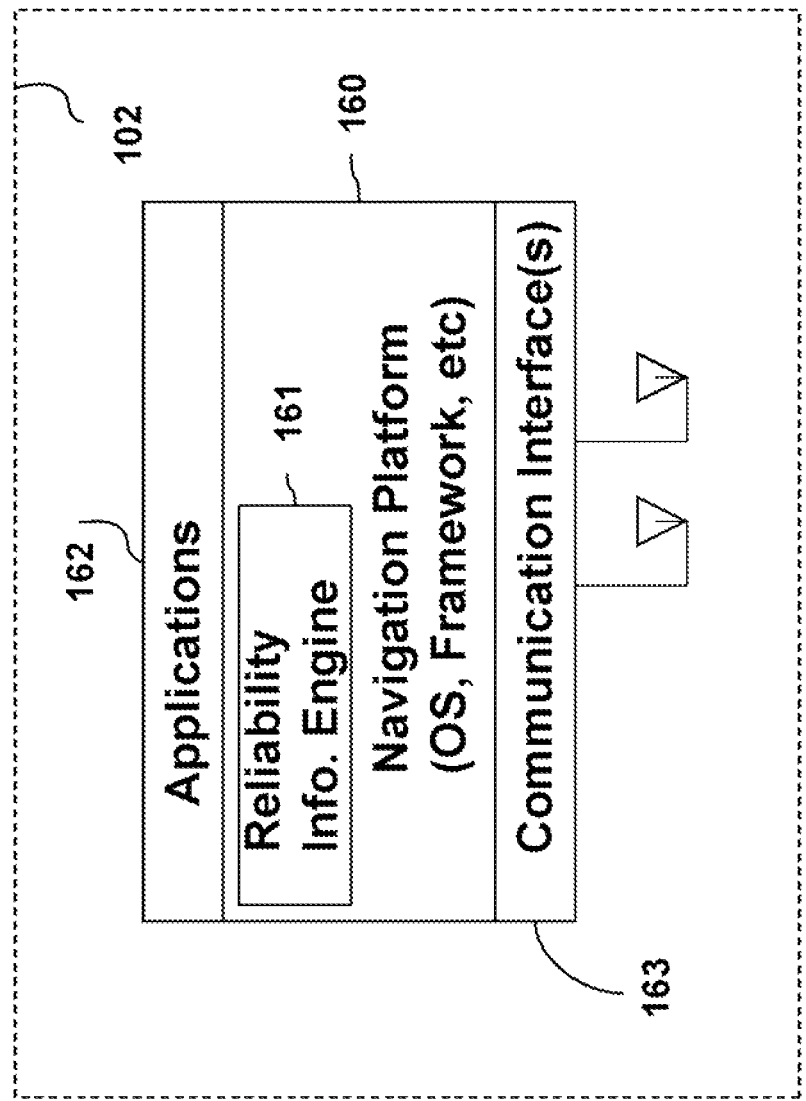
FIG. 1B is a schematic of a cloud based a telematics application in a mobile network.

In addition to the telematics server 150 shown in FIG. 1A, as shown in FIG. 1B, a navigation/vehicle telematics application also requires equipment on the mobile 101. Vehicles are assumed to be equipped with a car navigation head unit 102. This unit includes a navigation platform 160, a Reliability Information Engine 161, a central processing unit and peripherals, and various communication interfaces, 163.

The navigation platform is responsible for providing basic computing and communication services to applications 162, and the reliability information engine, which include the platform hardware and operating system. The applications include navigation, music player, connection manager, etc.

The Reliability Information Engine is responsible gathering vehicle telematics, position and other information to be transmitted to the telematics server. Communication is can use various communication networks, e.g., 3G/LTE (Long Term Evolution), WiMAX, Bluetooth, GPS, etc.

The network has a geographic coverage area 100, in which the clients are located. The clients use a radio access network (RAN) 110, to transmit and receive packet in the coverage area. The packets can contain control and information data.

Typical RANs are operated by telecommunication companies offering cellular network, or public WiFi network to serve mobile devices. The RAN also enables connections to one or more servers via the Internet.

Good coverage is defined for a location wherein the client has a high probability of communicating packets with the server, with few retransmissions, at high bit rate, and the like.

We describe methods that enable generating the coverage map depending on the functionality of the mobile devices and the level of access to information within the device.

All clients can determine their respective locations, e.g., by use of a GPS, by trilateration, or other ranging method with known locations of the fixed base station.

Each client can measuring any a number of radio signal parameters such as, received signal strength, bit error rate (instantaneous or average), packet error rate, the number of Automatic repeat ReQuests (ARQ), etc.

Figure 2:
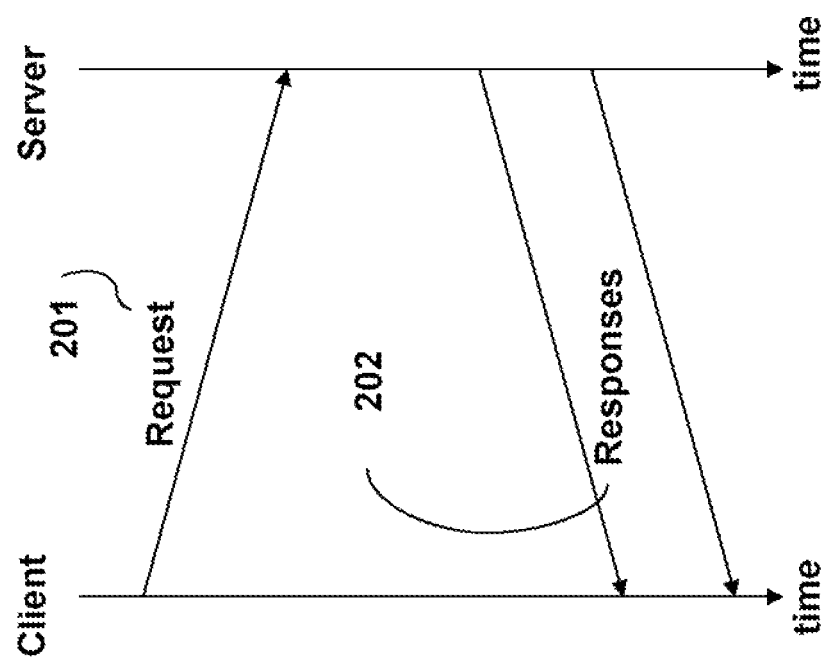
FIG. 2 is a timing diagram of request and response messaging between clients and a server according to embodiments of the invention.

As shown in FIG. 2, we use a simple model of the communication between the client and the server. The client makes a request 201, and the server responds 202. The request and response packets can include commands and data.

Coverage Map Generation from Mobile Requests

Figure 3:
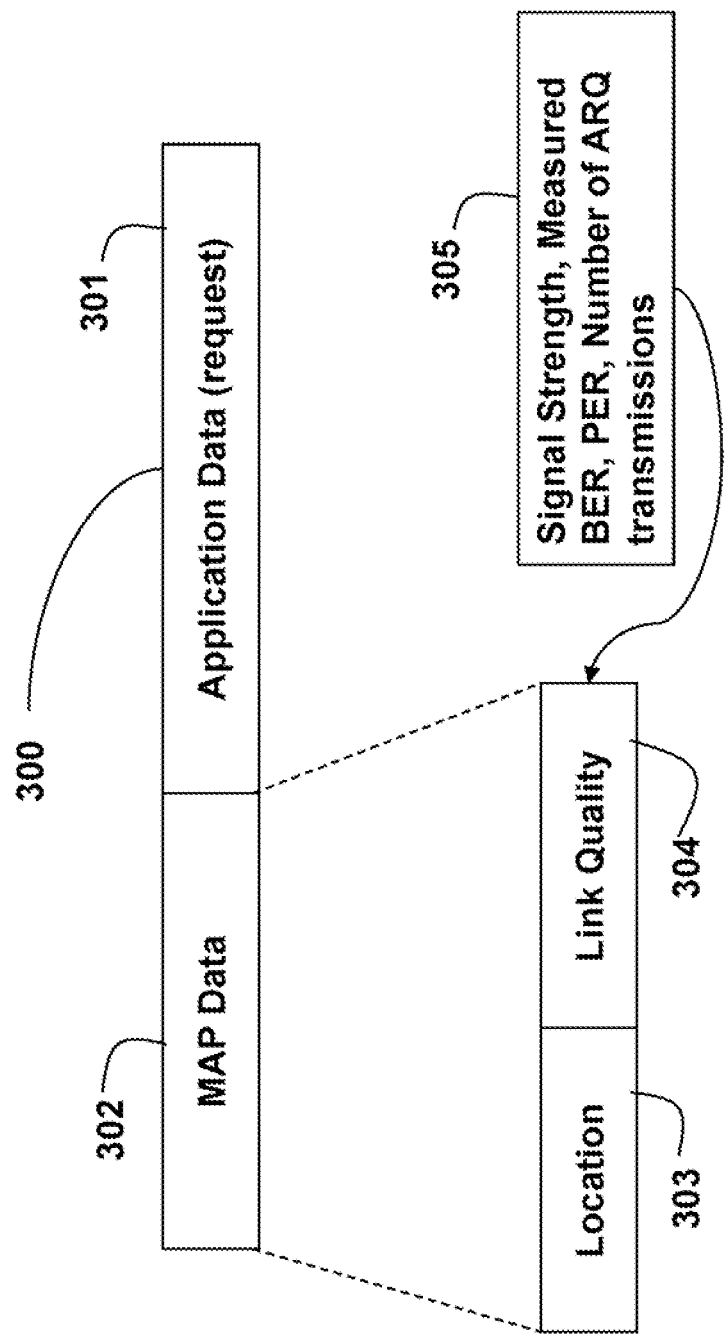
FIG. 3 is a block diagram of a request packet according to embodiments of the invention.

FIG. 3 shows a request packet 300. The packet contains an application data request 301 and a map data field 302. The map data field provides the server with information directly measured or known at the client. The map data field includes the location 303 of the client and the link quality 304.

The server is collects the locations and link qualities from all request packets, and stores that information in a table. Thus, over time, the server collects and maintains coverage data for many locations within the service area of the network.

Locations where the server has limited or no map data can be estimated or interpolated from nearby known locations. In addition, when map data are received from multiple clients for the same or near locations, the server can request average link quality information.

Figure 4:
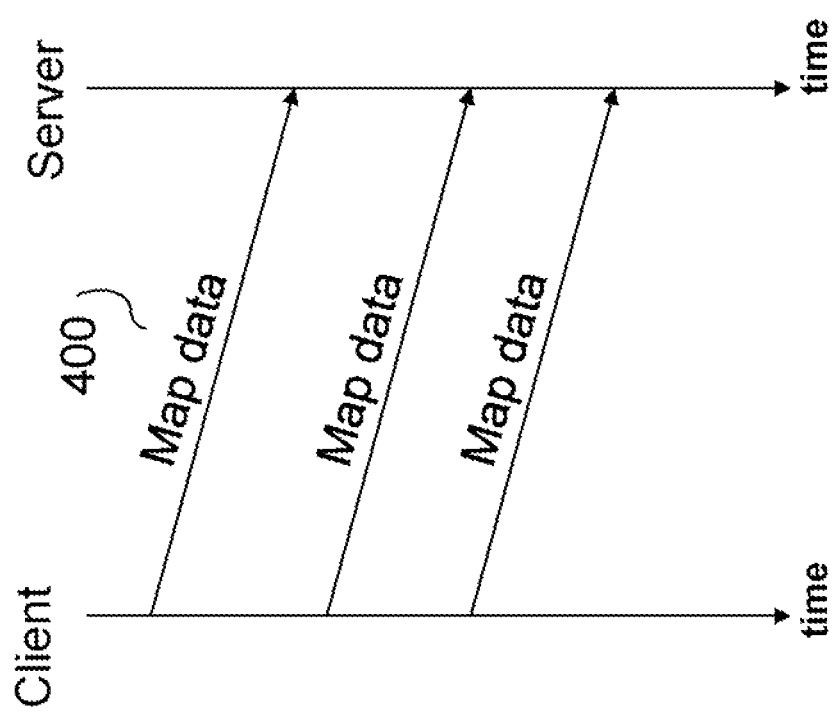
FIG. 4 is a timing diagram of periodic coverage map update according to embodiments of the invention.

As shown in FIG. 4, the client can also periodically transmit map data 400, even when the client has no particular request, while traversing the coverage area.

Coverage Map Generation from Application Layer Acknowledgements

The method described above relies on the ability of the clients to measure and report link quality to the server. It is possible to reduce the requirements on the client and shift the burden to the server. In this embodiment, the clients respond with an acknowledgement packet (ACK) whenever packets are received from the server.

Figure 5:
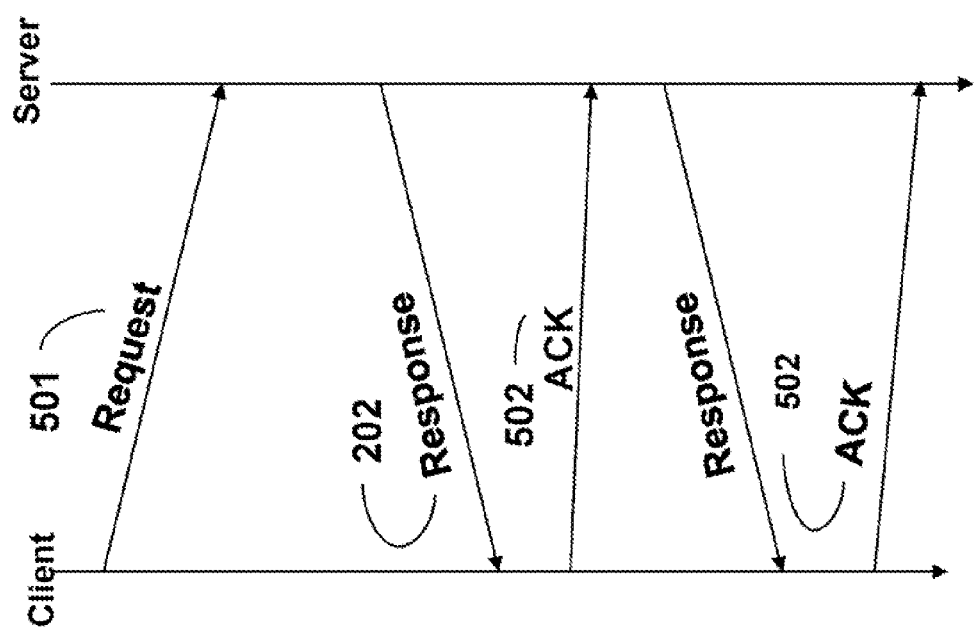
FIG. 5 is timing diagram of acknowledgement based request and response messages according to embodiments of the invention.

FIG. 5 depicts this embodiment. The client initiates communication with the server via a request packet 501, and the sever generates one or more response packets 202. The request packet does not contain the map data fields, therefore, the client acknowledges 502 the reception of each response packet from the server.

Figure 6:
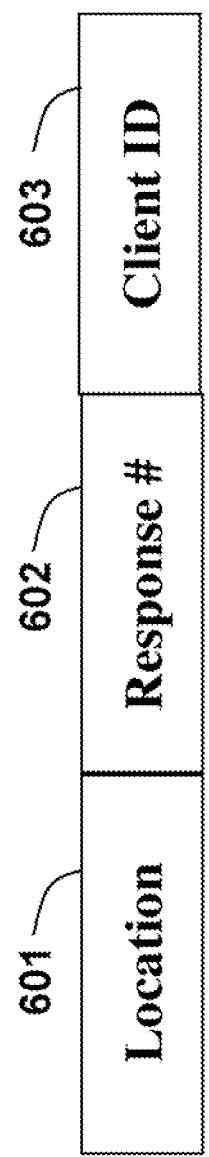
FIG. 6 is a block diagram of an acknowledgment message according to embodiments of the invention.

FIG. 6 shows the structure of ACK packet with a location field, 601, and a response number, 602, and a client ID 603. The response number is used to identify which response packet is being acknowledged and the location field informs the server as to the location of the client.

The construct and maintain the coverage map, the server has the response packets sent to clients, and the response packets along with the location and quality information.

Figure 7:
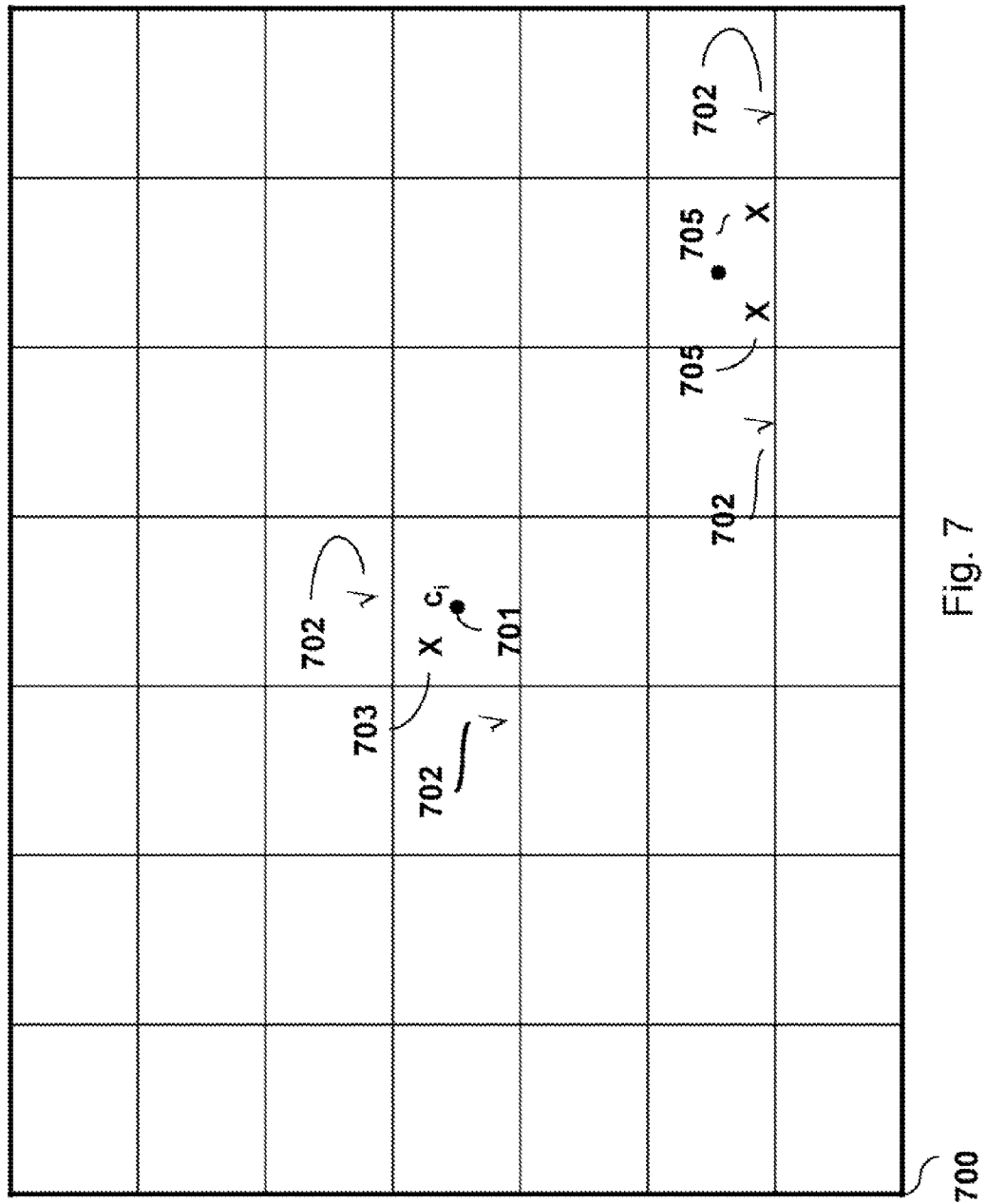
FIG. 7 is a schematic of a reliability map according to embodiments of the invention.

As shown in FIG. 7, we partition the coverage area 700 into multiple substantially non-overlapping regions 701, essentially quantizing the coverage area. The regions can be square, hexagonal, etc. In general, the regions are indexed by i, i=1, 2, . . . , I. The position of each region is defined by its center point; $c_i$, which is a two-dimensional vector denoting the coordinates of the center of the ith region. That is, $c_i=(c_{i,0}, c_{i,1})$, where $c_{i,0}$ and $c_{i,1}$ are the coordinates.

The sever maintains, for each region, a ratio of successfully acknowledged packets to transmitted response packets $$R_i = \frac{k_i}{N_i}. \tag{1}$$

For each region, $R_i$ is a measured reliability (quality) in region i, $k_i$ is the number of acknowledged packets and $N_i$ is the number of transmitted response packets. Based on the location field in each acknowledgement, the server determines the region from which the client packet was received.

This is done by determining a minimal distance between the reported location and the set of all center points, $c_i$, i=1, 2, . . . , I. If we denote the location reported in an acknowledgement as $L=(l_0, l_1)$ then the server computes $$\min_i \|L - c_i\|. \tag{2}$$

Upon receiving each acknowledgement packet, the server uses the location index i computed in equation (2) to update the reliability $R_i$. This is done by incrementing both $k_i$ and $N_i$ by one, in this case, since the server has successfully transmitted a packet and received its acknowledgement.

The sever also needs to determine the locations in the regions from which the response packets where transmitted, but not acknowledged.

Since no acknowledgement is received, the server has no direct knowledge of the client location. Therefore, the location is inferred by the server to generate the coverage map.

The server responds to all requests from the various clients during the course of normal operation by the acknowledgement packets 502, contains the client ID field.

The server uses the data in the acknowledgement packets that it has received correctly to infer the number and location of clients that have missing or lost response packets. For each response packet that is that is transmitted to a client, the server expects an acknowledgement, and thus maintains a list of outstanding response packets.

Assume, for example, that the server receives acknowledgements for two response packets, and these packets contain response numbers 1 and 3. Thus, the server can infer that the response packet number 2 was not received. In fact, the packet could have been received, but the acknowledgment was lost. This is of minor importance since the loss of either response or acknowledgement indicates a region of lower reliability.

FIG. 7 shows the location that is reported in the two received acknowledgement packets 702. We denote these locations as $L^1$ and $L^0$ and note that server has determined that a packet was lost as the client traversed the service area from $L^0$ to $L^1$. All that is required is that the server infers the location where the packet was lost. This can be done in a myriad of ways.

One method reasonable assumes that the client travels in a straight path between $L^1$ and $L^0$ and the server can compute an inferred location, $L^{inf}$ as a midpoint $$L^{inf}=(L^0+L^1)/2. \tag{3}$$

If the sever has a map of routes in the coverage area sowing roadways, the expected location of the client is easy to infer, particularly if the server tracks the speed of the client.

The inferred location 703 is also shown in FIG. 7, and $L^{inf}$ can now be used in equation 1 to identify in which region the client was when the packet was lost.

After the region index is found, the reliability measure can be updated by incrementing just the denominator, $N_i$, in equation 1.

We note that the procedure to infer the location of lost packets make a simple assumption about the motion of clients, i.e., they travel along straight paths. But this can be easily extended to more complicated mobility models or could make use of additional information such as roadmap data. For example once and inferred location, $L^{inf}$, is found the server can refine the location by translating it to the nearest road or pedestrian walkway.

We note that the method can be extended to cases in which more then one packet is lost between acknowledgements. Locations of multiple lost packets can be uniformly distributed between the locations of recently received acknowledgements.

As shown in FIG. 7, 702 indicates again the location of successfully received acknowledgments, but with two missing 705 location between.

Scaling of the Reliability Map

Over time, the server obtains large amounts of data related to the reliability of the service region. It is feasible then that a more detailed reliability map can be generated. In this case, the coverage area can be partitioned into smaller regions by increasing the number of center points, and recomposing the reliability measure in the new, smaller regions.

Although the invention has been described by way of examples of preferred embodiments, it is to be understood that various other adaptations and modifications can be made within the spirit and scope of the invention. Therefore, it is the object of the appended claims to cover all such variations

We claim:

1. A method for generating a coverage map for a wireless network, including a server communicating with clients in a coverage area, wherein the clients are mobile devices, comprising the steps of:
   receiving, at the server, location and reliability information from each client;
   constructing and maintaining, at the server, the coverage map according to the location and reliability information at the server;
   partitioning the coverage map into substantially non-overlapping regions to quantizing the coverage area;
   defining a position of each region by a center of the region; and
   maintaining for each region a ratio of successfully acknowledged packets to transmitted response packets in the region; and
   delivering telematic information from the server to the clients using the coverage map in response to requests by the clients.

2. The method of claim 1, wherein the reliability information includes qualities of wireless links between the server and the clients.

3. The method of claim 1, wherein each client includes navigation platform, a reliability information engine, a central processing unit and peripherals, communication interfaces, and applications.

4. The method of claim 3, wherein the applications include navigation, entertainment, and a manager.

5. The method of claim 1, wherein the reliability information is based on received signal strength, bit error rate, packet error rate, or a number of Automatic repeat ReQuests.

6. The method of claim 1, further comprising:
   interpolating a location of a client from the location information in the coverage map.

7. The method of claim 1, wherein the reliability information is averaged for multiple clients.

8. The method of claim 1, wherein the reliability information is determined at a particular client.

9. The method of claim 1, wherein the reliability information is determined at the server.

10. The method of claim 1, wherein the regions are scaled.

11. The method of claim 1, wherein the delivering of the telematic information is acknowledged by the clients.

12. The method of claim 11, wherein the reliability information is inferred from missing acknowledgements.

* * * * *